United States Patent [19]

Touron et al.

[11] 3,909,805

[45] Sept. 30, 1975

[54] PROGRAMMABLE READ ONLY MEMORY

[75] Inventors: Serge Auguste Touron, Bagnolet; Jean-Claude Duval, Le Perreux; Francis Mottini, Eaubonne, all of France

[73] Assignee: Compagnie Honeywell Bull, Paris, France

[22] Filed: Apr. 30, 1974

[21] Appl. No.: 465,638

[30] Foreign Application Priority Data

May 4, 1973 France ............................ 73.16101

[52] U.S. Cl. ........................ 340/173 SP; 340/166 R

[51] Int. Cl.[2] ........................................ G11C 17/00

[58] Field of Search ............................... 340/173 SP

[56] References Cited

UNITED STATES PATENTS

| | | | |
|---|---|---|---|
| 3,245,051 | 4/1966 | Robb | 340/173 SP |
| 3,611,319 | 10/1971 | Hyatt | 340/173 SP |
| 3,641,516 | 2/1972 | Castrucci | 340/173 SP |
| 3,810,127 | 5/1974 | Hoff | 340/173 SP |

*Primary Examiner*—Terrell W. Fears

*Attorney, Agent, or Firm*—John S. Solakian; Ronald T. Reiling

[57] ABSTRACT

A programmable read-only memory including word lines and bit columns, wherein the columns (good conductors) are less resistive than the word lines (resistive conductors or bands) and wherein the programming is facilitated by the inclusion of one or more shunt paths which are good conductors and which are intended to channel programming current away from at least one of the word lines formed in a semiconductor substrate as a result of their being connected to these word lines or resistive bands via semiconductor structures, the conductive state of which can be controlled by applying a difference of potential between the word line and the bit column with which the memory element to be destroyed is associated.

16 Claims, 8 Drawing Figures

Fig. 7.
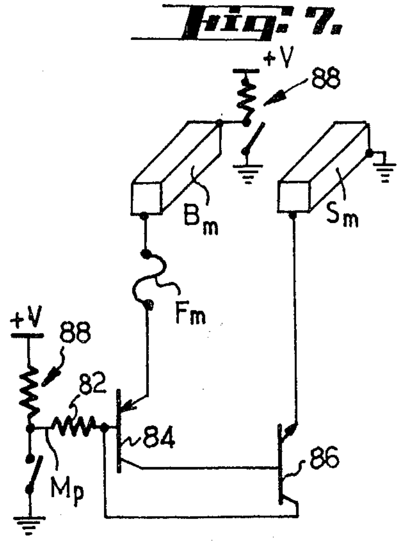
Fig. 8.
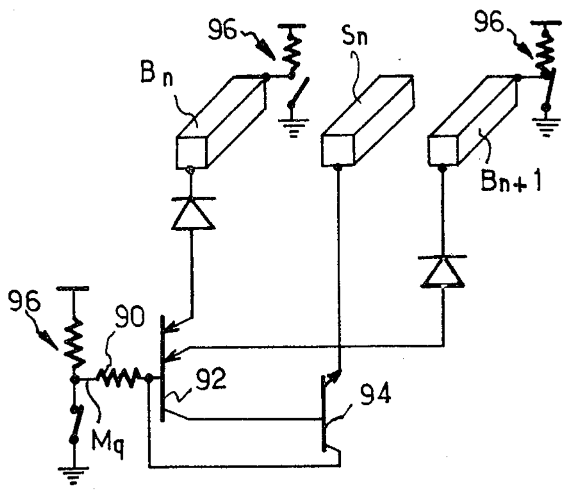
Fig. 5.
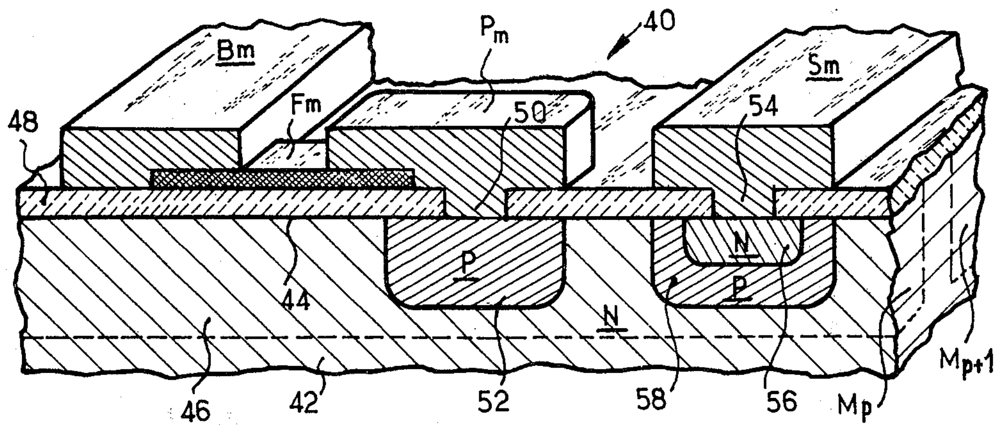
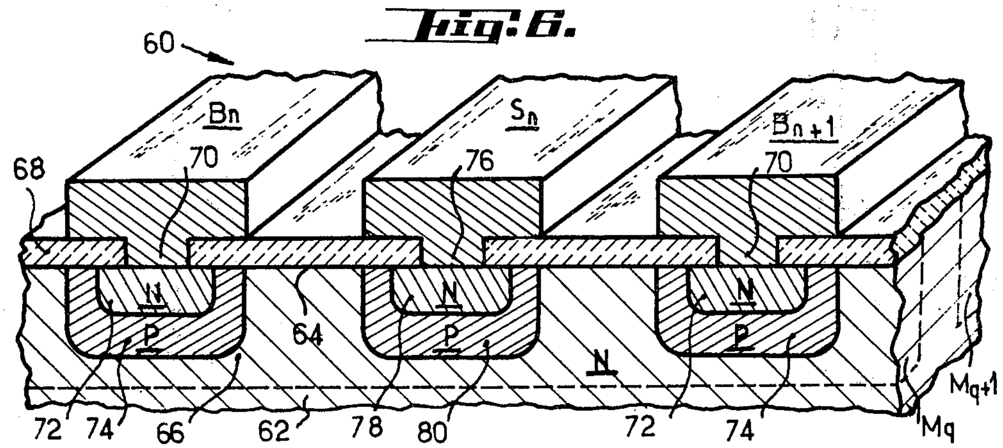

PROGRAMMABLE READ ONLY MEMORY

BACKGROUND OF THE INVENTION

The present invention relates to a means of programming integrated read-only memories, the matrix network of which is composed of conductor wires and semiconductor bands.

A read-only memory consists of a matrix network in the form of a grid made up of lines which convey the words selected and of columns which determine the bits which correspond to these words. The bits are made to correspond to a particular word by means of memory elements which couple the line carrying the word to the columns which will assign the appropriate bits to the word. The memory elements are therefore suitably placed at the intersections of the grid which the memory forms. The "read-only" nature of the memory results from the fact that the arrangement of the memory elements is fixed.

In practice, when read-only memories are being manufactured, the intersections are sometimes all provided with destructible linking elements so that it will subsequently be possible for a user to create a suitable pattern of linkages in the matrix network of the memory by destroying certain of these elements. What is performed in this way is a programming operation and the original general-purpose memory is therefore known as a programmable memory.

Destructible memory elements may be divided into two categories: those which, at the beginning, form a conductive link between the lines and the columns and can be destroyed by an overload, these being for instance members made of a fusible material which create an open-circuit when they are destroyed, and those which, at the beginning, create a barrier to any linkage, such as diodes which are intended to be reverse biased and which can be destroyed by causing them to break down under an overload or an excess voltage, after which they form short-circuits when the memories are in normal use. Consequently the programming operation generally consists in applying an electrical overload to the element to be destroyed by selecting the word line and the bit column to which the element is connected. It is therefore necessary for the conductors forming the network to carry this overload without loss; otherwise, when it reached the selected element, the overload would be too weak to produce the desired effect. This may be the case with certain memories which are integrated into semiconductor substrates in which the lines, for example, are formed by doping straight parallel bands in the substrate, these bands having a greater resistance than metal wires intersecting them which are applied to the substrate via an insulating layer, the wires forming the columns of the matrix network of the memory and being joined to their respective bands by destructible links.

To overcome problems of this type which arise when programming integrated read-only memories, one solution, which is obvious in theory, would be to use metal conductors to form the lines and columns of the memory network. However, this solution proves to be extremely difficult to put into practice in material terms and is therefore very costly.

SUMMARY OF THE INVENTION

In accordance with the invention, a programmable read-only memory is provided with means to program it which include shunt paths which are good conductors and which are intended to channel the programming current away from at least one of the said resistive bands formed in the semiconductor substrate as a result of their being connected to these bands via semiconductor structures, the conductive state of which can be controlled by applying a difference of potential between the wire and band with which the memory element to be destroyed is associated.

In this way the programming current will pass along the desired wire, through the controlled-conduction semiconductor structure, and back through the appropriate shunt path, which may itself be a metal wire applied to the semiconductor substrate in the same way as are the metal wires which form the columns of the read-only memory, in the case which is taken as an illustration. Also, the structures mentioned above, which are of the type having four layers of alternating conductivity types, may be arranged within the semiconductive bands forming the horizontal lines of the memory. The semiconductor material of which these bands consists may even be used as the material of one layer of the said structure, even possibly the layer which is used as the control grid or gate which actuates the structure. Otherwise, when the destructible element is a diode which is formed, within the material of which the bands are composed, by two semiconductor layers of opposite conductivity types, one of which is connected to a bit wire, the other layer may take the place of one of the four layers of the controlled semicondutor structure.

BRIEF DESCRIPTION OF THE DRAWINGS

The feature and advantages of the invention will become more clearly apparent from the following descriptions of arrangements, which are described solely as examples, and which are illustrated in the accompanying drawings in which:

FIGS. 5 and 6 show two embodiments of the means according to the invention for use in programming a read-only memory integrated in a semiconductor substrate;

FIG. 7 is an equivalent electrical diagram of the arrangement shown in FIG. 5, and FIG. 8 is an equivalent electrical diagram for the embodiment according to the invention of the means of programming the read-only memory shown in FIG. 6.

DETAILED DESCRIPTION OF THE PREFERRED EMBODIMENTS

Figure 1:
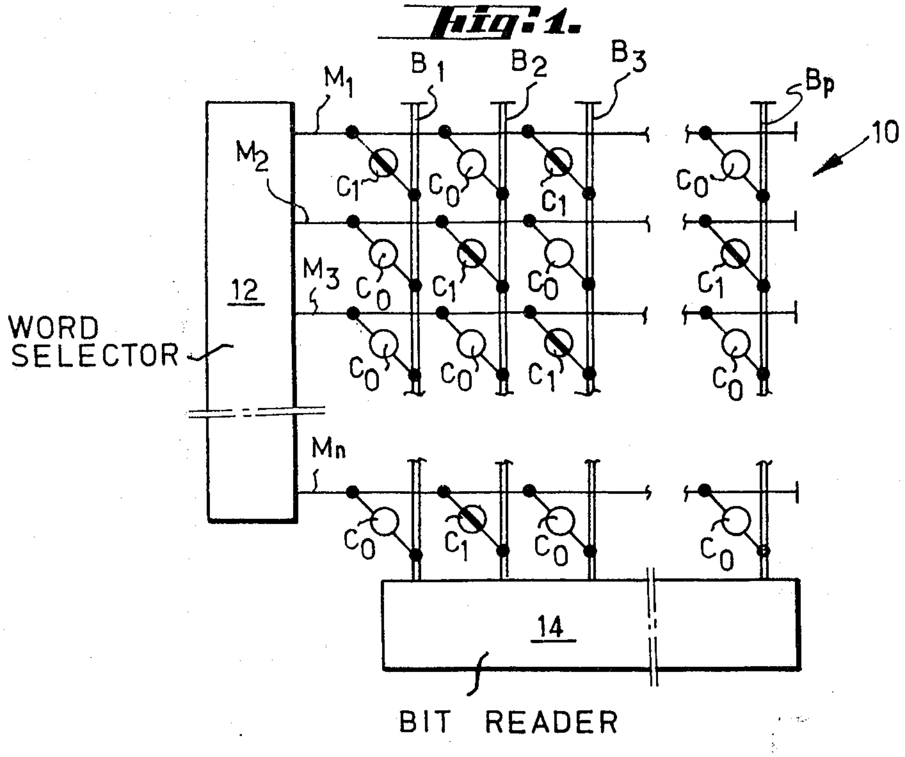
FIG. 1 shows an arrangement forming a read-only memory which is programmed for use in a particular case.

FIG. 1 shows chiefly an already programmed read-only memory 10. This memory is made up of a network of work lines $M_1$, $M_2$, . . . $M_n$ and bit columns $B_1$, $B_2$, . . . $B_p$. Each line communicates with the columns via coupling, linking or memory elements (which bear the references $C_1$ and $C_o$) depending on whether they do or do not respectively provide a connection between the lines and columns. The word lines are all connected to a word selector 12, while the columns are all connected to a unit 14 containing $p$ bit readers, 14, the number of bit readers corresponding to the number of bit columns.

Initially, the read-only memory 10 was capable of being programmed since each intersection had a destructible link C. If all the links originally constitute a conductive connection similar to those marked $C_1$ in FIG. 1, the programming operation consists in destroying certain elements, $C_o$, of the memory so as finally to be left with only the required pattern formed by the conductive elements which remained intact during the programming operation.

Figure 2:
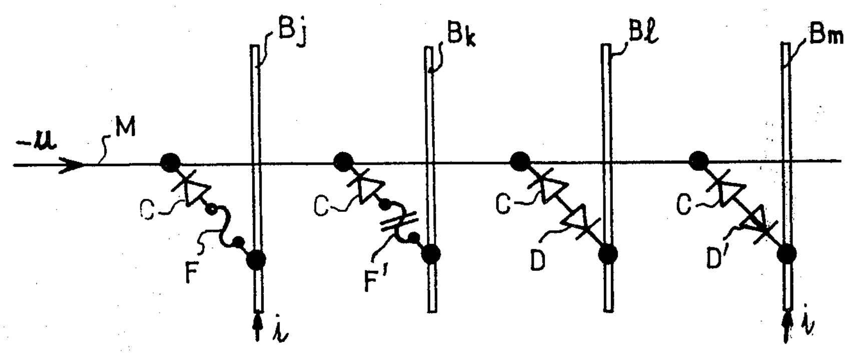
FIG. 2 shows examples of coupling elements widely used in programmable memories.

In this case each destructible link is usually formed from a fusible substance F which, as shown in FIG. 2, conducts a current $i$ from the bit column B$j$ when a voltage $-u$ is applied to the appropriate word line M and which, once destroyed (which is indicated by F′) isolates word line M from the corresponding bit column Bk.

It is also possible for all the links C in the programmable memory 10 to be isolators when the matrix is manufactured. Consequently, in this case the programming operation consists in rendering conductive ($C_1$) certain elements which were initially of the $C_0$ type. Thus, the initial link $C_0$ may be a reverse biased diode, such as the diode D in FIG. 2 which connects word line M to column B$l$. It will be seen later how the operation is performed which consists in making diode D a conductive connection similar to the connection marked D′ which connects word line M to bit column $B_m$. Normally, the destructible link is associated with a diode C which will allow the current $i$ to flow in only one direction and thus sets up a barrier against any transients in the matrix network which could affect the programming current. It is not intended that this diode C should be destroyed.

Figure 3:
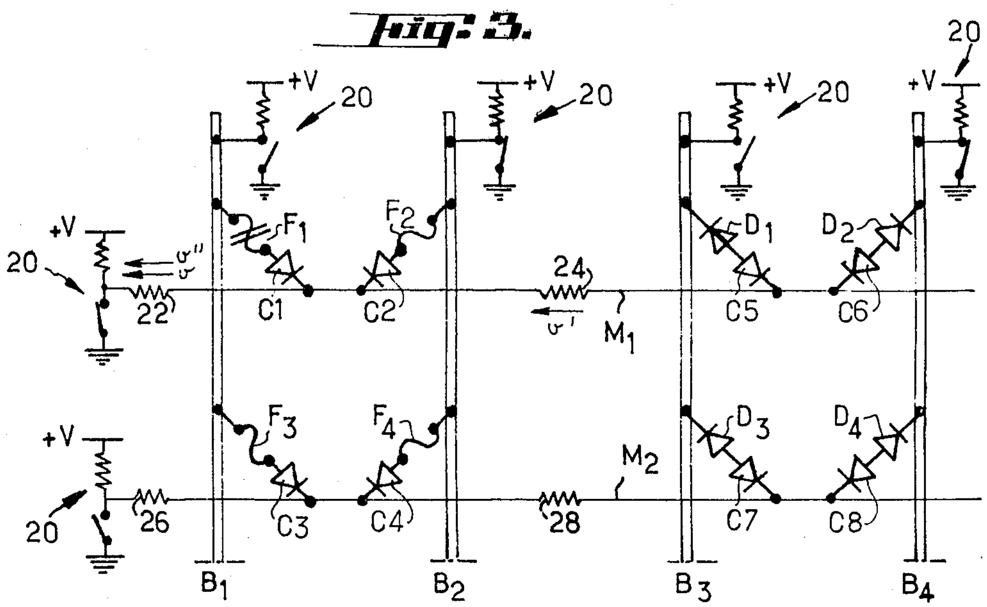
FIG. 3 illustrates various methods widely used in the prior art to program read-only memories.

FIG. 3 shows how the programming operation is usually carried out in the prior art. In the Figure, the two word lines $M_1$ and $M_2$ and the four bit columns $B_1$, $B_2$, $B_3$ $B_4$ are each connected to a switching member 20 by means of which they can be carried to a reference potential (earth or circuit ground) or to a voltage (+V), which voltage is positive with respect to the reference potential. In addition, word line $M_1$ is connected to columns $B_1$ and $B_2$ via fusible members $F_1$ and $F_2$ and to columns $B_3$ and $B_4$ via diodes $D_1$ and $D_2$, in the same way as word line $M_2$ is connected to columns $B_1$ and $B_2$ via fusible members $F_3$ and $F_4$ and to columns $B_3$, $B_4$ via diodes $D_3$ and $D_4$.

When word line $M_1$ is set to the reference potential by means of its associated switching member 20 and column $B_1$ is at volatge +V, also by means of its associated switching member 20, fusible member $F_1$ has passing through it a current the level of which is so adjusted as to melt the fusible material and thus break the electrical connection. Conversely, since bit line $B_2$ is at the reference potential, there is the same potential at both terminals of fusible member $F_2$, which therefore remains intact. The same applies to fusible member $F_3$, both terminals of which are at voltage +V. In addition, diode $C_4$ prevents any current flowing in fusible member $F_4$ which, without the C diode, would be between the +V voltage from line $M_2$ and the reference potential from bit column $B_2$.

Since bit columns $B_4$ and $B_3$ are at the reference potential and the +V voltage respectively, diode $D_1$ is reverse biased and, depending on its characteristics and the level of voltage +V, may be destroyed. As far as diode $D_2$ is concerned, it remains intact since its electrodes are both at the same potential. The same is true of diode $D_3$. Diode $D_4$ on the other hand would be forward biased if there were no diode $C_8$, the latter being designed to withstand the difference in potential in question. Diode $D_4$ is protected in this way and remains intact.

It will now be assumed that the columns are perfect conductors but that lines $M_1$ and $M_2$ are resistive, their resistance per unit length being shown schematically in FIG. 3 by resistors 22, 24, 26 and 28. Where it is intended that only the fusible member $F_1$ associated with line $M_1$ is to be destroyed, the programming current which flows through it will cause a voltage drop $+v$ across the terminals of resistor 22. If, in the same way, bit column $B_3$ had been set to voltage +V, the current flowing through diode $D_1$ would have caused a voltage drop $+v'$ across the terminals of resistor 24 and a voltage drop $+v''$ across the terminals of resistor 22. Consequently, depending on the resistance presented by the lines and the strength of the current flowing through them, it may be that the power supplied to the links to be destroyed is less than the minimum required for this purpose. These circumstances arise particularly when an integrated read-only memory to be programmed, is formed both in and on a semiconductor substrate. As will be seen more clearly below with reference to FIGS. 5 and 6, the lines (or the dolumns) are resistive semiconductor bands formed by doping the semiconductor substrate and the columns (or the lines) are usually metal wires which are good conductors of electricity applied to the substrate. Considering the resistance of semiconductor bands, integrated read-only memories are difficult to program by this way.

Figure 4:
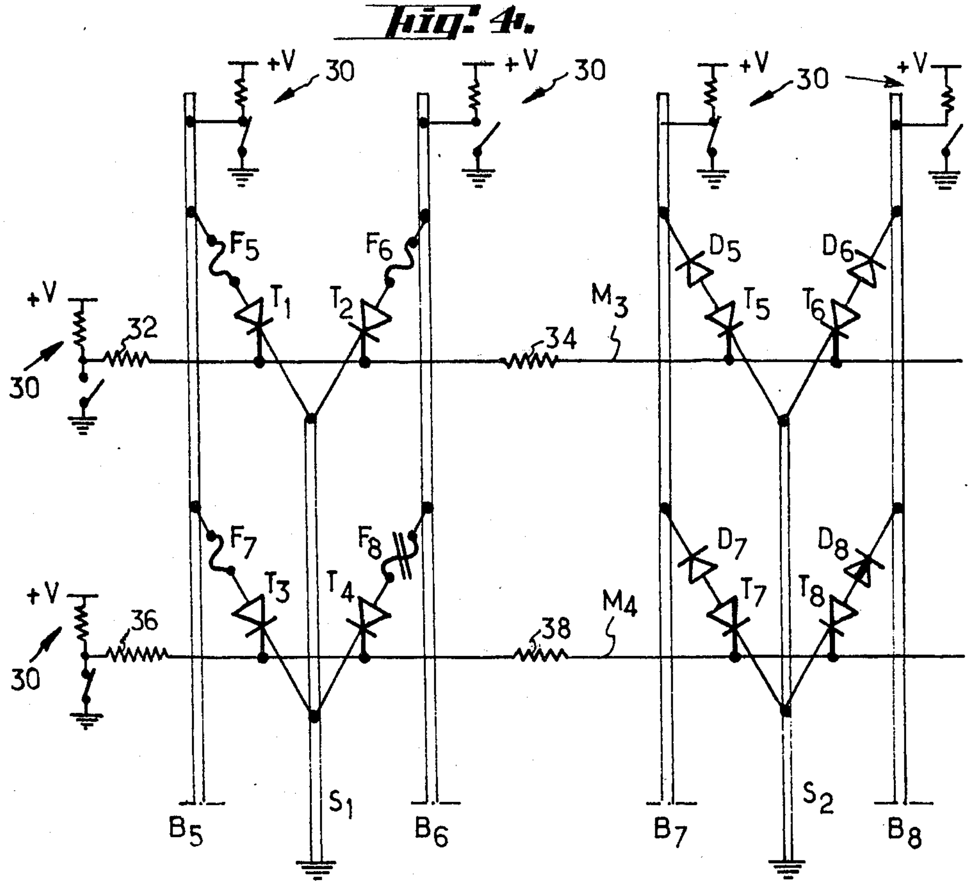
FIG. 4 is a diagram to explain how read-only memories are programmed using the means according to the invention.

The means provided by the invention to overcome the aforementioned problems are shown schematically in FIG. 4. FIG. 4 is in fact a diagram which explains how the means according to the invention operate, and it is similar to the diagram in FIG. 3 which relates to the prior art means, this being done in order to better bring out the advantages of the present invention. Thus, FIG. 4 once again contains two word lines $M_3$ and $M_4$ and four bit columns $B_5$, $B_6$, $B_7$, $B_8$ each of which is connected to a switching member 30 identical to members 20 in FIG. 3. Line $M_3$ and columns $B_6$ and $B_8$ are at voltage +V and line $M_4$ and columns $B_5$ and $B_7$ are connected to the reference potential. In this example, columns $B_5$, $B_6$, $B_7$ and $B_8$ are perfect or substantially non-resistive conductors, while the lines offer a certain amount of resistance per unit length, which is shown symbolically by resistors 32, 34, 36 and 38.

As in FIG. 3, the links for bit columns $B_5$ and $B_6$ are fusible members $F_5$, $F_6$, $F_7$ and $F_8$, while the links for bit columns $B_7$ and $B_8$ are diodes $D_5$, $D_6$, $D_7$ and $D_8$.

The means according to the invention comprise shunt paths $S_1$ and $S_2$, which shunt paths are formed from a conductive material such as that which forms the columns B of the memory and which are parallel to them. Thus the shunt paths are of low resistance as compared to the word lines. As shown in FIG. 4, the shunt paths are at the reference potential during programming.

The means according to the invention also include semiconductor structures $T_1$through $T_8$, the conductive state of which can be controlled. Such structures may comprise four superimposed layers having alternate conductivity types, the structure possessing a control layer which forms the gate of the structure. The structure thus operates like a thyristor. Each of the structures $T_1$ to $T_4$ connects one of the fusible members $F_5$ to $F_8$ to shunt path $S_1$, the gate (which in this case is the inner layer which forms the anode grid) being connected to the word line to which the link corresponds. The same is true of structures $T_5$ to $T_8$ in relation to the diodes $D_5$ to $D_8$ which are connected to shunt path $S_2$.

It will now be explained how a read-only memory according to the invention is programmed. In the case of both fusible members $F_5$ and diode $D_5$, the gates of the corresponding thyristors $T_1$ and $T_5$ are at voltage +V, while such thyristors' ($T_1$ and $T_5$) anode to cathode voltage is zero. Thus no current is able to flow through them and links $F_5$ and $D_5$ remain intact during programming.

In the case of the thyristors $T_2$ and $T_6$ which correspond to fusible member $F_6$ and diode $D_6$ respectively, since their gates are at the same voltage +V as their anodes, they are not triggered and elements $F_6$ and $D_6$ therefore remain intact.

In the case of the thyristors $T_3$ and $T_7$ which correspond to links $F_7$ and $D_7$ respectively, all their electrodes are at the reference potential. Consequently no current flows through them and elements $F_7$ and $D_7$ remain intact during programming.

As for thyristors $T_4$ and $T_8$, their gates are at the reference potential while their anodes are at voltage +V with respect to their cathodes. Thyristors $T_4$ and $T_8$ are therefore triggered and a current from columns $B_6$ and $B_8$ may flow through and destroy links $F_8$ and $D_8$, i.e., open circuit link $F_8$ and short circuit link $D_8$, before flowing to earth ground (reference potential) through shunt paths $S_1$ and $S_2$. In this way, the programming current flows via the shunt paths $S_1$ and $S_2$, which are good conductors of electricity, and thus destroys the links through which it passes. In this case, the only function of the word lines is to cause the selected thyristor to be actuated by feeding a triggering current to it.

When programming has been completed, the junction between the gates and anodes of the thyristors will be conductive and a connection may thus be made either via undestroyed fusible members or via diodes which have been destroyed to form short-circuits. This being so, it will be possible to ensure that no current flows through the other junctions of the thyristors, which is always the case if the shunt paths $S_1$ and $S_2$ are isolated or held at the same potential as the bit columns.

Two embodiments according to the invention of a means of programming integrated read-only memories on and in a semiconductor substrate are shown in FIGS. 5 and 6, the link being a fusible member in FIG. 5 and a diode in FIG. 6.

Referring firstly to FIG. 5, the section 40 of the read-only memory which is shown is made up of a substrate 42 formed from a semiconductor substance such as silicon. By growing a material 46 which is doped with impurities having N type conductivity characteristics on the substrate 42 by a so-called epitaxial process and by isolating linear bands in this material, mutually parallel bands representing the words M*p*, M*p*+1, have been formed, these being equivalent to the word lines shown in FIGS. 3 and 4. Perpendicular to these bands, metal wires which are good conductors of electricity, such as aluminum wires, have been applied to the substrate and are insulated therefrom by an isolating layer 48, which is made of silica for example. Only one conductor B*m* is shown in the Figure, this forming the column of the memory in position *m*. At the intersection between bit column B*m* and word line M*p* is shown a destructible link which in the present case is a fusible member F*m*. The latter is connected to word line M*p* by a contact P*m* which projects through an opening 50 in the insulating layer 48. Where this opening is situated there is formed an area 52 having P type conductivity, which is enclosed in the substance 46 of which word line M*p* is composed.

In accordance with the invention, at least one bit column has corresponding to it a shunt path for the programming current, in the manner shown in FIG. 4. In FIG. 5 bit column B*m* has corresponding to it a shunt path S*m* which, being formed on the substrate parallel to the adjoining bit columns and consisting of a material which is a good conductor, may be of the same form and physical makeup as the columns in the memory. The shunt paths in question are connected to the intersections along lines M*p*, M*p*+1 via openings 54 formed in the insulating layer 48. At the points at which openings 54 are situated, two areas 56 and 58 are formed within the substance 46 of N type conductivity from which the word lines M of the memory are composed, with area 56 enclosed inside area 58 and being in contact with shunt path S*m*. The conductivity characteristics of area 58 are of P type and those of area 56 of N type. In the Figure, area 52, the space between areas 52 and 58, area 58, and area 56 form a semiconductor structure containing four superimposed layers of alternating conductive types, the conductive state of which can be controlled. This structure may thus be compared to a thyristor in which the layer which forms the control grid or gate is located between areas 52 and 58 and is composed of the N type substance 46 which forms the appropriate word line. If the intention is to program memory 40 using the voltages employed in FIG. 4, the area 52 connected to the fusible member F*m* forms the anode of the thyristor and area 56 forms its cathode in the same way as is shown schematically in FIG. 4.

What will now be considered is a programmable read-only memory in which the lines are semiconductor bands and the columns are metal wires which are good conductors, and in which the destructible links are diodes. This is what is shown in FIG. 6.

FIG. 6 illustrates a perspective view of a section 60 of an integrated read-only memory based on a semiconductor substrate 62 made of a substance such as silicon. As in FIG. 5, the lines of the memory, of which only lines M*q* and M*q*+1 are shown, are bands 66 which are grown from the substrate 62 by an epitaxial process and then isolated, these bands 66 having an N type doping. As to the bit columns, of which only those in positions *n* and *n*+1 are shown, these are preferably formed from a substance which is a good conductor of electricity such as aluminum and are usually isolated from the substrate by an insulating layer 68, which my be made of silica. At the intersections formed by the network of the read-only memory 60, openings 70 are formed in the insulating layer 68 to connect the lines and columns. In the embodiment shown, the diodes which are shown as $D_5$ to $D_8$ in FIG. 4 are produced by doping areas 72 and 74 which are enclosed in the N type substance which forms the bands 66 representing the word lines of the memory. Since the substance forming bands 66 is of N type, area 74 will be of P type and the area 72 contained within it, which is in contact with the appropriate bit column, will be of N type.

In accordance with the invention, the means of programming the memory 60 includes shunt paths S*n*, each of which is associated with at least one of the bit columns adjacent to it. FIG. 6 shows an embodiment of a shunt path for two bit columns, which in consequence is equivalent to the relationship shown in FIG. 4 of shunt path $S_2$ between bit columns $B_7$ and $B_8$.

As is apparent from FIG. 6, the form and physical make-up of shunt lines S*n* are the same as those of the adjoining columns corresponding to them, and the shunt lines are likewise connected to the word lines which they intersect via openings 76 formed in the isolating layer 68.

As in the case of FIG. 5, the controlled-conduction semiconductor structure has four layers of opposite conductive types P-N-P-N, the first layer comprising the area 74 of the diode formed where the bit columns are situated. The last two layers are formed by areas 78 and 80, which are of N and P types respectively, between which is situated the N type substance forming the word lines. As in the preceding case, this means that the controlling layer which represents the gate of the thyristor so formed is the one situated between the P type areas 74 and 80.

FIGS. 7 and 8 show equivalent electrical circuits for the arrangements shown in FIGS. 5 and 6 respectively. In FIG. 7 can be seen the conductive bar which forms bit column B*m*, this being connected, via fusible member F*m*, and a PN junction, to the semiconductor band which forms the word line M*p* whose equivalent resistance per unit length is shown by resistor 82. The controlled conduction four-layer structure is represented by transistors 84 and 86, the base of each of which is excited by the collector of the other. Finally, the shunt path S*m* is connected directly to the emitter of transistor 86. The device external to the memory by means of which voltages are applied to its various parts is represented by switching members 88 which supply to the parts either the reference potential or the voltage +V. It can be seen from FIG. 7, as it can from FIG. 4, that the programming current will only arise when the outer end of the word line is at the reference potential.

FIG. 8 is an equivalent electrical diagram for the arrangement shown in FIG. 6. Thus, the bit columns B*n* and B*n*+1 are shown as metal bars between which is situated a shunt path S*n*. A diode which represents the junction separating layers 72 and 74 in FIG. 6 is connected via a PN junction to the appropriate word line M*q*, the equivalent resistance of which is shown by resistor 90. The equivalent circuit for the controlled-conduction structure consists, as in FIG. 7, of two transistors 92, 94, the base of each of which is controlled by the collector of the other.

The emitter of transistor 94 is connected directly to the shunt path S*n*. As can be seen from FIGS. 8 and 4, a programming current passes either through one of the two diodes or through both simultaneously when the appropriate columns B*n* and B*n*+1 are at voltage +V and when word line M*q* is at the reference potential. As shown in FIG. 8, the programming current will only flow through the diode corresponding to bit column B*n*. The links to be destroyed are thus selected by means of switching members 96 which are capable of connecting the members to which they are connected either to the reference potential or to voltage +V.

The invention is not, of course, in any way limited to the embodiments shown and described. On the contrary; depending on the biasing voltages employed and the nature of the links joining the lines and columns, the controlled-conduction semiconductor structures could be different from those described above. In particular, it has been seen that one of the areas forming the diode which connects the lines and columns could be considered as a layer of the controlled-conduction structure.

What this means in general terms is that the invention covers any means which constitute technical equivalents of those described, and combinations thereof, if these are carried out in the spirit of the invention and are made use of within the scope of the following claims.

Having thus described the invention, what is claimed as new and novel and for which it is desired to secure Letters Patent is:

1. A programmable read-only memory of the type which is produced in integrated circuit form from a semiconductor substrate and of which the matrix network, comprising word lines and bit columns which make up the said matrix, is formed by straight mutually parallel, resistive semiconductor bands of a type having specific conductive characteristics which are formed in the said substrate, and by mutually parallel wires which are good conductors which are applied to the substrate via an insulating layer and which intersect the said bands at intersections which possess destructible memory elements which connect a band to a wire, characterized in that it includes means for programming it, said means comprising shunt paths which are good conductors and which are intended to channel the programming current away from at least one of the said bands, the paths being connected to the bands by semiconductor structures the conductive state of which can be controlled by applying a difference of potential between the wire and band to which the memory element to be destroyed corresponds.

2. A memory according to claim 1, characterized in that the said shunt paths are parallel to the said wires, these wires being applied to the said substrate in the same way and formed from the same material.

3. A memory according to claim 1, characterized in that the said controlled-conduction semiconductor structures are arranged within the said bands.

4. A memory according to claim 1, characterized in that the said semiconductor structures are structures containing four superimposed layers of alternating conductivity types which have a control layer forming the gate of the said structure.

5. A memory according to claim 4, characterized in that the layer forming the gate of the said semiconductor structure consists of the doped substance of the specific type from which the said bands are formed.

6. A memory according to claim 5, characterized in that the said semiconductor structure is controlled by the anode grid.

7. A memory according to claim 5, characterized in that the said semiconductor structure is controlled by the cathode grid.

8. A memory according to claim 1, characterized in that the said destructible element is a fusible member and is connected to the material of which the appropriate band is formed via a layer of material the conductivity type of which is opposite from the said specific type, the layer being formed in the substance of which the said band consists.

9. A memory according to claim 1, characterized in that the said destructible element is a diode which is formed, in the material of which the said resistive bands consist, by two semiconductor layers of opposite conductivity types one of which is connected to one of the said wires, while the other layer forms one of the four layers of the said controlled-conduction semiconductor structure.

10. A memory according to claim 1, characterized in that the said resistive bands and the said conductor wires form the word lines and the bit columns of the said memory respectively.

11. A memory according to claim 1, characterized in that the said conductor wires and the said resistive bands form the word lines and the bit columns of the said memory respectively.

12. A programmable read-only memory comprising:

A. a plurality of substantially parallel bit columns, each of said columns including a good conductor which is low in resistance;

B. a plurality of substantially parallel word lines traversing said bit columns to form intersections, each of said lines including a resistive conductor;

C. means for programming said memory including 1. a plurality of shunt paths, each path including a good conductor which is low in resistance and which is intended to channel a programming current away from at least one of said word lines,
2. a plurality of semiconductor means, coupled at said intersection between said word lines and bit columns, and
3. means for applying a difference of potential to at least one of said intersections between said word line and said bit column to which a memory element is formed by said intersection and which corresponds to the memory element to be destroyed, said difference of potential coupled to cause the respective one of said semiconductor means to conduct thereby destroying the associated one of said memory elements.

13. A memory according to claim 12, wherein said semiconductor means are thyristor type devices having an anode, cathode and gate electrode, said gate electrode coupled with the respective one of said word lines, and said anode and cathode electrodes coupled between the respective one of said bit columns and one of said shunt paths.

14. A memory according to claim 13, further comprising a destructible element coupled in the coupling between said anode electrode and said respective one of said bit columns, whereby said programming current operates to destroy said destructible element thereby destroyiing the memory element associated with such destroyed destructible element, such that a destroyed memory element is representative of a first stored state and such that a memory element which has not been destroyed is representative of a second stored state.

15. A memory according to claim 14, wherein each of said destructible elements includes a fusible member, said fusible member open-circuited in response to said programming current.

16. A memory according to claim 14, wherein each of said destructible elements include a diode element, said diode element short-circuited in response to said programming current.

* * * * *